United States Patent
Fujimoto et al.

(10) Patent No.: US 11,514,460 B1
(45) Date of Patent: Nov. 29, 2022

(54) SYSTEMS AND METHODS FOR CROSS-CHANNEL COMMUNICATION MANAGEMENT

(71) Applicant: UIPCO, LLC, San Antonio, TX (US)

(72) Inventors: Yuibi Fujimoto, Helotes, TX (US); Michael James Waldmeier, Helotes, TX (US); Gage Robert Lynch, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 274 days.

(21) Appl. No.: 16/118,900

(22) Filed: Aug. 31, 2018

Related U.S. Application Data

(60) Provisional application No. 62/552,982, filed on Aug. 31, 2017.

(51) Int. Cl.
| | |
|---|---|
| *G06Q 30/00* | (2012.01) |
| *G06F 16/955* | (2019.01) |
| *G06F 40/30* | (2020.01) |
| *G06F 3/0481* | (2022.01) |
| *H04L 65/1069* | (2022.01) |
| *H04L 67/02* | (2022.01) |

(52) U.S. Cl.
CPC ......... *G06Q 30/016* (2013.01); *G06F 3/0481* (2013.01); *G06F 16/9558* (2019.01); *G06F 40/30* (2020.01); *H04L 65/1069* (2013.01); *H04L 67/02* (2013.01)

(58) Field of Classification Search
CPC ... G06Q 30/016; G06F 16/9558; G06F 40/30; G06F 3/0481
USPC .............. 705/304, 7.15, 26.7, 7.29, 309; 379/88.01, 142.1
See application file for complete search history.

(56) References Cited

U.S. PATENT DOCUMENTS

| | | |
|---|---|---|
| 5,822,741 A | 10/1998 | Fischthal |
| 5,825,869 A | 10/1998 | Brooks et al. |
| (Continued) | | |

OTHER PUBLICATIONS

P. Liston, J. Byrne, O. Keogh and P. J. Byrne, "Beyond calls: Modeling the connection center," 2017 Winter Simulation Conference (WSC), 2017, pp. 3804-3815, doi: 10.1109/WSC.2017.8248092. (Year: 2017).*

*Primary Examiner* — Dennis W Ruhl
*Assistant Examiner* — Donald J Edmonds
(74) *Attorney, Agent, or Firm* — Perkins Coie LLP

(57) ABSTRACT

Disclosed herein are systems and methods capable of establishing a communication session between a user and an analyst. The contents of the communication session are analyzed to make recommendations of goods and services to the user. Otherwise, the communication session may be redirected from one channel, for example, chatting to another channel, for example, voice call, to another analyst. The user's information and the communication session details are retained, and provided to another analyst before the user is redirected. Such systems, apparatuses, methods, and computer program products use real-time machine learning scoring algorithm to determine which analyst the users should be transferred to, and thereby saving a lot of time for both the analysts and the users, and significantly reduce misroutes by eliminating human errors.

20 Claims, 7 Drawing Sheets

(56) References Cited

U.S. PATENT DOCUMENTS

| | | | |
|---|---|---|---|
| 8,447,625 B2 * | 5/2013 | Churchill | A61B 90/00 |
| | | | 705/2 |
| 10,440,180 B1 * | 10/2019 | Jayapalan | G06N 5/04 |
| 10,630,840 B1 * | 4/2020 | Karp | H04W 4/14 |
| 2002/0055973 A1 * | 5/2002 | Low | H04L 12/1822 |
| | | | 709/204 |
| 2004/0059705 A1 * | 3/2004 | Wittke | G06N 5/00 |
| 2006/0098624 A1 * | 5/2006 | Morgan | H04L 65/1006 |
| | | | 370/352 |
| 2008/0084975 A1 | 4/2008 | Schwartz | |
| 2008/0095355 A1 | 4/2008 | Mahalaha et al. | |
| 2010/0262549 A1 * | 10/2010 | Kannan | G06Q 30/0613 |
| | | | 707/769 |
| 2011/0091024 A1 | 4/2011 | Yasrebi et al. | |
| 2011/0307257 A1 | 12/2011 | Pereg et al. | |
| 2012/0076283 A1 | 3/2012 | Ajmera et al. | |
| 2012/0130771 A1 | 5/2012 | Kannan et al. | |
| 2014/0189519 A1 * | 7/2014 | Powell | G06F 16/955 |
| | | | 715/736 |
| 2014/0358612 A1 | 12/2014 | Sri et al. | |
| 2015/0071788 A1 | 3/2015 | Thompson et al. | |
| 2015/0081470 A1 * | 3/2015 | Westphal | G06Q 30/0631 |
| | | | 705/26.7 |
| 2015/0100889 A1 * | 4/2015 | Tuchman | G06F 3/0485 |
| | | | 715/737 |
| 2015/0235240 A1 * | 8/2015 | Chang | G06Q 30/0202 |
| | | | 705/7.31 |
| 2015/0310377 A1 * | 10/2015 | Schlumberger | |
| | | | G06Q 10/063114 |
| | | | 705/7.15 |
| 2015/0331853 A1 | 11/2015 | Palmonari et al. | |
| 2015/0339676 A1 * | 11/2015 | Tuchman | G06Q 30/01 |
| | | | 705/304 |
| 2016/0012451 A1 * | 1/2016 | Shanmugam | H04L 41/22 |
| | | | 705/304 |
| 2016/0269258 A1 * | 9/2016 | McGreevy | H04L 67/14 |
| 2016/0371703 A1 * | 12/2016 | Monegan | H04L 67/148 |
| 2016/0381091 A1 * | 12/2016 | O'Connor | H04L 65/1083 |
| | | | 370/260 |
| 2017/0111505 A1 * | 4/2017 | McGann | H04M 3/5235 |
| 2017/0208177 A1 * | 7/2017 | Conway | H04M 3/523 |
| 2018/0012232 A1 * | 1/2018 | Sehrawat | H04L 51/02 |
| 2019/0050875 A1 | 2/2019 | McCord | |
| 2020/0118143 A1 * | 4/2020 | Sehrawat | H04L 51/02 |

* cited by examiner

SYSTEMS AND METHODS FOR CROSS-CHANNEL COMMUNICATION MANAGEMENT

CROSS REFERENCES TO RELATED APPLICATIONS

This application claims priority to U.S. Provisional Application Ser. No. 62/552,982, filed Aug. 31, 2017, which is hereby incorporated by reference in its entirety.

TECHNICAL FIELD

This application relates generally to systems, apparatus, and methods for cross-channel communication management, and in particular relates to seamless transfer of communication channels between a customer and customer service representatives.

BACKGROUND

As the Internet has become ubiquitous in daily life, customer interactions increasingly occur online. Proper management of online customer service resources has consequently become paramount to businesses. Negative customer reviews of online interactions can result in a substantial, negative impact on the company's finances and reputation. However, because customer service is often a labor-intensive industry, conventional methods fail to adequately provide online customer service.

In a conventional online customer service process, goods and services are typically offered through a communications-based network of customer assistance centers that can receive and handle communications from various customers. Such centers have long used communications systems that allow an agent of a company to interact with customers over a text chat or a voice call. An agent of the company typically engages the customers in a dialog to identify the needs of the customers and provide answers or solutions. In some cases, when a customer is unable to receive a proper solution for their problem using a particular communication channel (e.g., a text chat session) with the agent, the customer may attempt to leave that channel (e.g., chat) and contact the company through another channel (e.g., voice call). Such redirection of the communication from one channel to another channel is common in a customer service environment. Unfortunately, customers may be misrouted when being transferred from one channel of communication to another channel. In such a scenario, when the customer calls after leaving a text-based channel (e.g., chat or SMS), the customers have to start the request from the beginning because the customer may no longer be authenticated and/or the new agent may not possess the details and context from their previous interaction with a different agent. In some cases, the communication with customers loses context due to human limitations, for instance, when one agent of the company is communicating with multiple customers at a time.

Therefore, there is a desire for system that allows for real-time monitoring and auditing of multiple online chat interactions to redirect a customer from one communication channel to another correct communication channel.

SUMMARY

Disclosed herein are systems and methods capable of addressing the above-described shortcomings and may provide any number of additional or alternative benefits and advantages. As described herein, embodiments of the present disclosure relate to systems, apparatuses, methods, and computer program products for establishing a communication session between a customer and a customer service representative (CSR). The contents of the communication session are analyzed to make recommendations of goods and services to the customer and provide answers to questions of the customer. In some cases, when the answers to the questions may not be available, then the communication session may be redirected from one channel (e.g., web chat) to another channel (e.g., voice call), such as to another CSR. The customer's information and the communication session details are retained, and provided to another CSR before the customer is redirected to other CSR. Such systems, apparatuses, methods, and computer program products of the present disclosure use real-time machine learning scoring algorithm to determine which CSR the customers should be transferred to, and thereby saving a lot of time for both the CSR and the customers, and significantly reduce misroutes by eliminating human errors.

Systems, apparatuses, methods, and computer program products of the present disclosure execute a system server or any other server of a system that performs various processes on records associated with an ongoing and last communication session between a customer and a customer service representative (CSR) containing various data fields, indicating customer information and customer request, in order to determine whether the customer should be transferred to another CSR during the same session or upon receiving a new communication request after a predetermined period of time. In some cases, using data in the communication session records between the customer and the analyst, a system server or any other server of the system may generate outbound call requests that is associated with the customer, and assign a score for the outbound call requests, which the system server or any other server of the system uses to store and sort the outbound call requests according to a priority based on their relative scores. CSR computers may query and fetch the outbound call requests from a database, and then present the outbound call requests to a CSR according to the priority level of the respective outbound call requests. This can ensure that the correct CSR works with the customer to maximize efficiency, reduce CSR resources, and minimize customer negative impact.

In one embodiment, a server-implemented method may include generating, by a server, a session record for a web-based interaction between a first client computer operated by a user and a first customer service representative computer, the session record comprising a set of alphanumeric characters representing a conversation between the first client computer and the first customer service representative computer, the session record further comprising authentication status and identification data of the user; generating, by the server, computer comprehension data from the set of alphanumeric characters in the session record based at least an occurrence of one or more alphanumeric characters from the set of alphanumeric characters matching a pre-defined list of attributes, wherein the server generates data structures specifying different types of computer comprehension data based on one or more computer comprehension data generation rules, and wherein at least one of the one or more computer comprehension data generation rules correspond to a semantic relationship between the alphanumeric characters within the set of alphanumeric characters; identifying, by the server, whether a second client computer originating a voice call is associated with the user; in response to determining that the second client computer is associated with the user and upon transmitting the voice call to a second customer service representative computer, displaying, by the server, a graphical user interface on the second customer service representative computer, the graphical user interface comprising: a plurality of interactive hyperlinks configured such that upon an activation of an interactive hyperlink, wherein the server dynamically renders a browser that displays data corresponding to at least one of the computer comprehension data, the authentication status, and the identification data of the user.

In another embodiment, a system may include a plurality of customer service representative computers comprising a first and a second customer service representative computers; a first client computer and a second client computer where at least one of the first client computer and the second client computer is configured to originate a voice call; and a server configured to generate a session record for a web-based interaction between the first client computer operated by a user and the first customer service representative computer, the session record comprising a set of alphanumeric characters representing a conversation between the first client computer and the first customer service representative computer, the session record further comprising authentication status and identification data of the user; generate computer comprehension data from the set of alphanumeric characters in the session record based at least an occurrence of one or more alphanumeric characters from the set of alphanumeric characters matching a pre-defined list of attributes, wherein the server generates data structures specifying different types of computer comprehension data based on one or more computer comprehension data generation rules, and wherein at least one of the one or more computer comprehension data generation rules correspond to a semantic relationship between the alphanumeric characters within the set of alphanumeric characters; identify whether the second client computer originating the voice call is associated with the user; in response to determining that the second client computer is associated with the user and upon transmitting the voice call to the second customer service representative computer, display a graphical user interface on the second customer service representative computer, the graphical user interface comprising a plurality of interactive hyperlinks configured such that upon an activation of an interactive hyperlink, wherein the server dynamically renders a browser that displays data corresponding to at least one of the computer comprehension data, the authentication status, and the identification data of the user.

In another embodiment, a server-implemented method comprises receiving, by a server, a session record corresponding to a web-based interaction between a client computer of a customer and a first customer service representative computer, the session record comprising a set of alphanumeric characters representing a conversation between the client computer and the first customer service representative computer; parsing, by the server, the set of alphanumeric characters within the session record to identify a subset of the set of alphanumeric characters corresponding to a pre-defined list of attributes; generating, by the server, a set of vectorized scores for each alphanumeric character within the subset of the set of alphanumeric characters by executing a predetermined scoring protocol; identifying, by the server, whether a second client computer originating a voice call is associated with the customer; identifying, by the server, a second customer service representative within a plurality of customer service representatives by executing an artificial intelligence n-gram model where the artificial intelligence n-gram model comprises a neural network comprising a set of nodes corresponding to a map of vectorized alphanumeric characters for each of the pre-defined list of attributes correlated to a vector score of each profile of each customer service representative within a plurality of customer service representative in accordance with a correlation factor, wherein the artificial intelligence n-gram model is configured to receive the vectorized scores for each alphanumeric character within the subset of the set of alphanumeric characters and identify the second customer service representative; routing, by the server, the voice call to a second customer service representative computer operated by the second customer service representative; monitoring, by the server, a time duration of the voice call between the second client computer and the second customer service representative computer; and upon a termination of the voice call having the time duration less than a predetermined period of time, training, by the server, the artificial intelligence n-gram model by updating the correlation factor.

In another embodiment, a system comprises a plurality of customer service representative computers a client computer; and a server configured to receive a session record corresponding to a web-based interaction between the client computer of a customer and a first customer service representative computer, the session record comprising a set of alphanumeric characters representing a conversation between the client computer and the first customer service representative computer; parse the set of alphanumeric characters within the session record to identify a subset of the set of alphanumeric characters corresponding to a pre-defined list of attributes; generate a set of vectorized scores for each alphanumeric character within the subset of the set of alphanumeric characters by executing a predetermined scoring protocol; identify whether a second client computer originating a voice call is associated with the customer; identify a second customer service representative within a plurality of customer service representatives by executing an artificial intelligence n-gram model where the artificial intelligence n-gram model comprises a neural network comprising a set of nodes corresponding to a map of vectorized alphanumeric characters for each of the pre-defined list of attributes correlated to a vector score of each profile of each customer service representative within a plurality of customer service representative in accordance with a correlation factor, wherein the artificial intelligence n-gram model is configured to receive the vectorized scores for each alphanumeric character within the subset of the set of alphanumeric characters and identify the second customer service representative; route the voice call to a second customer service representative computer operated by the second customer service representative; monitor a time duration of the voice call between the second client computer and the second customer service representative computer; and upon a termination of the voice call having the time duration less than a predetermined period of time, train the artificial intelligence n-gram model by updating the correlation factor.

It is to be understood that both the foregoing general description and the following detailed description are explanatory and are intended to provide further explanation of the subject matter as claimed.

BRIEF DESCRIPTION OF THE DRAWINGS

The accompanying drawings constitute a part of this specification and illustrate embodiments that, together with the specification, explain the subject matter.

DETAILED DESCRIPTION

Figure 1:
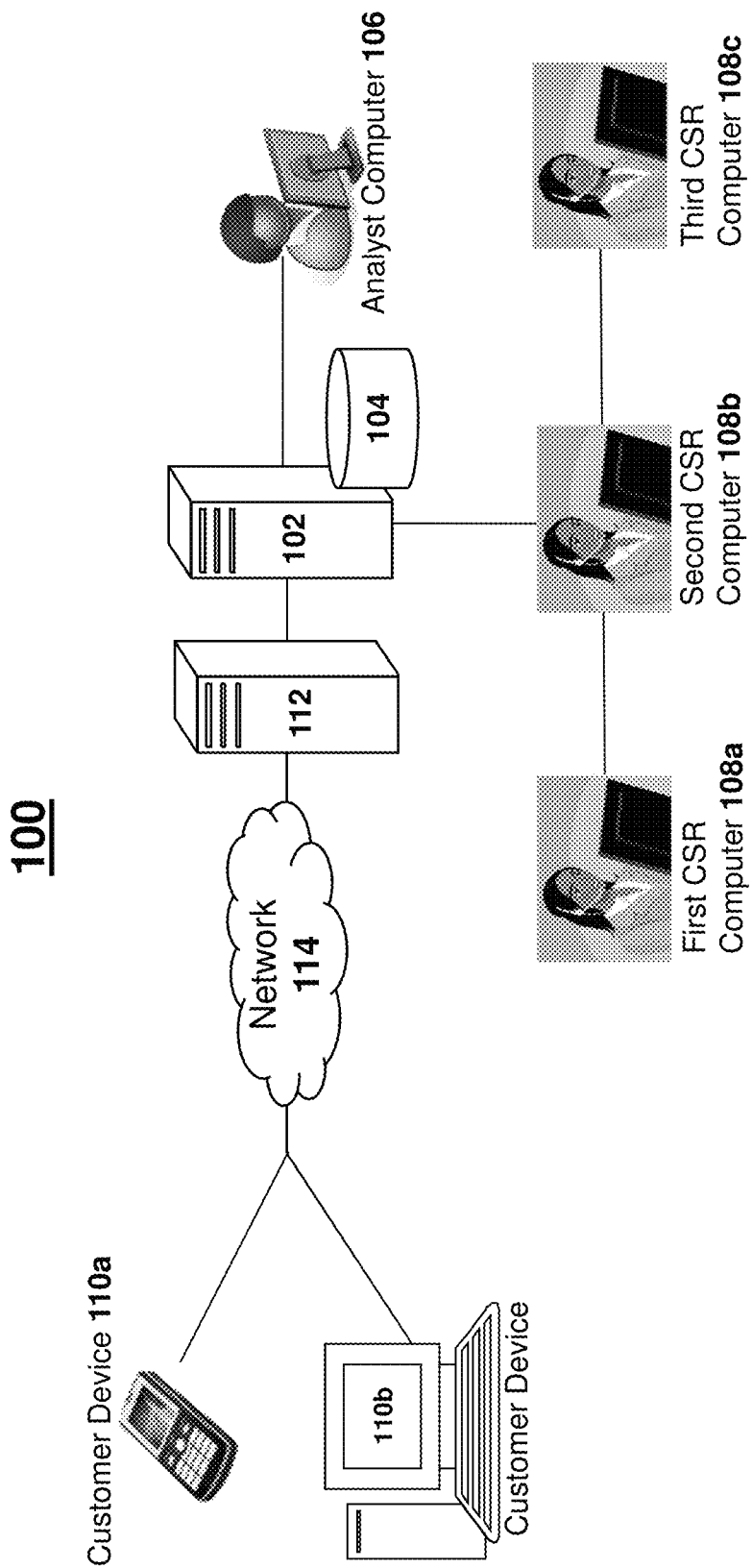
FIG. 1 shows components of a system for seamless transfer of communication channels between a customer and customer service representatives (CSRs), according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

FIG. 1 shows components of a system 100 for seamless transfer of communication channels between a customer and customer service representatives, according to an embodiment. The system 100 may include system server 102, system database 104, analyst computer 106, multiple customer service representative (CSR) computers 108 (such as a first CSR computer 108a, a second CSR computer 108b, and a third CSR computer 108c), customer devices 110 (hereinafter also refereed as client devices or user devices) such as a first customer device 110a and a second customer device 110b, and a webserver 112.

The system server 102, the system database 104, the analyst computer 106, the CSR computers 108, the customer devices 110, and the webserver 112 are connected to each other through a network 114. The examples of the network 114 may include, but are not limited to, private or public LAN, WLAN, MAN, WAN, and the Internet. The network 114 may include both wired and wireless communications according to one or more standards and/or via one or more transport mediums. The communication over the network 114 may be performed in accordance with various communication protocols such as Transmission Control Protocol and Internet Protocol (TCP/IP), User Datagram Protocol (UDP), and IEEE communication protocols. In one example, the network 114 may include wireless communications according to Bluetooth specification sets, or another standard or proprietary wireless communication protocol. In another example, the network 114 may also include communications over a cellular network, including, e.g., a GSM (Global System for Mobile Communications), CDMA (Code Division Multiple Access), EDGE (Enhanced Data for Global Evolution) network. Even though server 102 is shown as a single server, in some configurations, system 100 may include more than one server 102 where each server is configured to perform one or more of the tasks and operations described herein.

In operation, system server 102 may generate session records containing various data fields comprising communication data between a customer and a CSR and indicating one or more particular customers of the system 100 associated with the session records. Hereinafter, the term "customers," "clients," and "users" may be interchangeably used. The session records may be stored into a database 104 for further processing. The system server 102 may perform various processes on the session records, such as determining whether the session records contain data matching attributes of one or more scenarios and/or one or more CSRs. Using the session records stored in the database 104, the system server 102 may identify insights and/or requests that are associated with the customers of the system 100 within the session records and subsequently generate an outbound communication request from a new communication channel for the customers of the system 100 based on the insights and/or the customer requests. The system server 102 may generate a score for the outbound communication requests, which the system server 102 uses to store and sort the outbound communication requests according to a priority, based on the relative scores. CSR computers 108 may query and fetch outbound communication requests from the database 104 and present the outbound communication requests to be addressed by the CSR operating the CSR computer 108 according to the priority level of the respective outbound communication requests.

System server 102 may be any computing device comprising a processor and non-transitory machine-readable storage medium and capable of performing the various tasks and processes described herein during execution. Non-limiting examples of the system server 102 may include a desktop computer, a server computer, a laptop computer, a tablet computer, and the like. For ease of explanation, FIG. 1 shows a single computing device functioning as the system server 102. However, it should be appreciated that some embodiments may comprise any number of computing devices capable of performing the various tasks described herein.

A system server 102 may generate and/or capture a session record for a web-based interaction between a customer device 110 (for example, a first customer device 110a) and a webserver 112. In some embodiments, the system server 102 may generate and/or capture a session record for a web-based interaction between customer devices 110 and CSR computers 108. CSRs may operate CSR computers 108, which may receive a plurality of incoming calls or text communications from a plurality of customers operating the customer devices 110. The phone calls from the customer devices 110 to the CSR computers 108 may be placed over a public telephone network or over a Voice Over Internet Protocol network. Text communications from the customer devices 110 to the CSR computers 108 may similarly be placed over the Internet or another network. A plurality of CSRs may operate the CSR computers 108 interacting with the plurality of customers. Herein, while only three customer service representative and a single customer will be illustrated, it should be understood that a plurality of different customer service representatives might be associated with the CSR computers 108 interacting with the plurality of customers.

A system server 102 may capture a session record for a web-based interaction on a communication channel between customer devices 110 and CSR computers 108 as the customer and the CSR exchange communication messages with each other. The session record may represent text inputs provided by the customer and/or the CSR. Alternatively, the session record may represent verbal communication such as speech communicated using the customer devices 110 and the CSR computers 108. The system server 102 may perform analysis of the verbal communication in a manner similar to that of text input by converting the speech of the customer and the CSR into text using multiple processes such as voice recognition and speech-to-text processing.

A system server 102 may store captured session record in a database 104 that include communication messages and/or voice call records from multiple conversations between a customer and different CSRs. The database 104 may store all the session records. For example, the database 104 may store records of all of the communication messages conducted by all the CSRs. In some embodiments, the individual communication messages within the database 104 may be separated and grouped into sub-records, or multiple session records may be aggregated into larger corpus of data. The individual session records in the database 104 may be recorded as text files, word processing files, audio files, or any other suitable file format. Each session record stored in the database 104 may comprise one or more session attributes containing data fields related to the interaction, such as a session data, a session identifier, a timestamp, a customer identifier, a customer service representative identifier, and source device identifier information uniquely identifying the customer device 110 (e.g., IP address, MAC address). The system server 102 may capture data for the session record between the customer device 110 and the CSR computers 108 at different times of the interactions, such as capturing source device information from header portions of IP packets or customer identifier information from an authentication attempt.

The system server 102 may execute various processes on incoming session records, such as text data field formatting, identifying an associated customer and a CSR, or determining a particular customer request having attributes matched to a text stream. In some embodiments, the system server 102 may execute a session analysis algorithm, which may be implemented as one or more computing algorithms to analyze the session record between the customer and the CSR, both individually and in aggregate, stored in the database 104. The session analysis algorithm may be executed and maintained by the system 100 that operates CSR computers 108. The session analysis algorithm executed by the system server 102 may process the session record by dividing the session record into a series of text streams comprising one or more texts in a conversation or session. Each session record may correspond to a text of one of the contributors (such as customers and CSRs) in the conversation. The session record files stored in the database 104 may be formatted with tags or other markers that indicate transition between the contributors (such as customers and CSRs) in the conversation. The formatted information may be used by the session analysis algorithm to distinguish dialogue turns in the session record. In some embodiments, the analysis of session records is enabled by the session analysis algorithm through decipher of words or terms used in session record, customer data, customer service representative data, or other data of interest appearing in the session record. Once the session record is decoded by the system server 102, a graphic representation of the decoded data will appear on the CSR computers 108 and optionally, the analyst computer 106 screen. In some embodiments, the system server 102 may color-code or otherwise mark decoded data from the session record to categorize importance. A CSR operating the CSR computer 108 can also color-code or otherwise mark decoded data from the session record to categorize importance.

In some implementations, the system server 102 may include a set of one or more scenario attribute models that may indicate to the system server 102 whether a particular type of customer request is potentially detected or ongoing. Scenario models may be computer files stored on the system server 102 or separate database device, such as a database 104, and include a set of pre-defined attributes that indicate a type of scenario of potential customer request. In such implementations, the system server 102 may use decoded data field entries in the incoming session records to identify one or more matches to corresponding text attributes in the scenario models. In some cases, a session between the customer device 110 and the CSR computer 108 may transition between different communication channels when the session record data matches a particular scenario. For example, a session may begin when a customer operating the customer device 110 accesses the website and is properly authenticated as a customer by the webserver 112. The customer operating the customer device 110 may then communicate with a CSR operating the CSR computer 108. The system server 102 may gather the session record that may contain data gathered through the web-based interactions from the customer device 110 and text based/telephone-based interaction from the CSR computer 108 and/or interactive voice response (IVR) system. The system server 102 upon determining that the session record texts matches a particular scenario, in some cases, the system server 102 may generate a customer call alert and/or transfer the customer to another appropriate communication channel to communicate with another CSR operating another CSR computer 108.

A webserver 112 may be any computing device hosting a website accessible to customer devices 110 via Internet. The webserver 112 may include a processor and non-transitory machine-readable storage capable of executing the various tasks and processes described herein. Non-limiting examples of such computing devices may include workstation computers, laptop computers, server computers, laptop computers, and the like. While the system 100 includes a single webserver 112, in some embodiments the webserver 112 may include any number of computing devices operating in a distributed computing environment.

The webserver 112 may execute software applications configured to host a website (e.g., Apache®, Microsoft IIS®), which may generate and serve various webpages to customer devices 110. The website may be used to generate and access data stored on a database 104. In some implementations, the webserver 112 may be configured to require customer authentication based upon a set of customer authorization credentials (e.g., username, password, biometrics, cryptographic certificate). In such implementations, the webserver 112 may access a database 104 configured to store customer credentials, which the webserver 112 may be configured to reference in order to determine whether a set of entered credentials purportedly authenticating the customer match an appropriate set of credentials that identify and authenticate the customer. Similarly, in some implementations, the webserver 112 may generate and serve webpages to the customer devices 110 based upon a customer role (e.g., investor) within the system 100. In such implementations, the customer role may be defined by data fields in customer records stored in the system database 104, and authentication of the customer and customer role may be conducted by the webserver 112 by executing an access directory protocol. The webserver 112 may then be instructed to generate webpage content, access or generate data stored in the system database 104, according to the customer role defined by the customer record in the database 104.

In some embodiments, as the webserver 112 may require customers to authenticate using credentials that identify a customer as a valid customer of the enterprise system 100, the webserver 112 or any other server such as the system server 102 may generate records related to customer's interactions with the website hosted by the webserver 112. For example, the webserver 112 or any other server such as the system server 102 may generate and/or capture a session record for an interaction between the customer device 110 and the webserver 112. A session record may contain text data fields related to the interaction, such as a session data, a session identifier, a timestamp, a customer identifier, a CSR identifier, and source device information identifying the customer device 110 (e.g., IP address, MAC address). The webserver 112 or any other server such as the system server 102 may store the session records locally or in a database 104 hosted on any server within the system 100. The webserver 112 may capture data for the session at different times of the interactions, such as capturing source device information from header portions of IP packets, or customer identifier information from an authentication attempt.

In some instances, a session between a customer and a CSR may transition between multiple communication channels. For example, a session may begin when a user accesses the website from the customer device 110 and is properly authenticated as a customer by the webserver 112. The user may then have trouble in accessing certain features or may identify certain irregularities in their account information, prompting the customer to contact a CSR computer 108 over the telephone. In such a case, a system server 102 may transmit the session information for the customer to the CSR operating the CSR computer 108 over the telephone, and therefore the session information of the customer may continue as the session transitions from a web-based channel to a telephone-based channel. In some embodiments, a CSR operating a CSR computer 108 may input various information fields into a GUI presented on the CSR computer 108, such as the purported customer who is contacting the CSR and source device information to obtain the customer session record. The session record may contain data gathered through the web-based interactions from customer device 110 and the telephone-based interaction from the CSR computer 108 and/or IVR system. In some instances, customer identifier data and/or source device information may be received by a CSR operating a CSR computer 108 through an automated IVR server (not shown) of a helpdesk portion of the system 100.

A CSR computer 108 may be any computing device comprising a processor and capable of performing the various processes and tasks described herein. The CSR computer 108 may be coupled to helpdesk software, such as queuing system or IVR system, such that the CSR computer 108 allows a CSR to interact with a customer over a phone and/or text, but can also capture telephony information regarding an ongoing call. The CSR computer 108 may produce an interactive graphical user interface (GUI) that allows the CSR to navigate the website and account information for a customer, if the customer is an authenticated customer, and may allow the CSR to generate, update, and monitor records or "tickets" of ongoing helpdesk requests for customer concerns. The software executed by the CSR computer 108 may also automatically, or through a user-driven input, execute requests associated with a customer identifier.

The CSR computer 108 GUI may receive interactive hyperlinks corresponding to session records that are related to subject matter (e.g., type of department) or procedural role (e.g., time-sensitive) of the respective CSR. In some implementations, the session records may have a data field identifying the nature of the customer request and another data field indicating a time-sensitive nature or customer-sensitive nature of the customer request. Based on this data field, the CSR computer 108 may receive the interactive hyperlinks corresponding to the session records having subject matter or procedural data fields associated with the CSR credentials. For instance, the CSR credentials of CSR specializing in time sensitive requests would indicate to the CSR computer 108 that the CSR computer 108 should retrieve and present a session record having a data field indicating that the particular request of the customer is time sensitive. In some implementations, the session records may be stored into dedicated databases or sub-databases of the database 104, where each sub-database is configured to store session records with certain types of session records. In such implementations, the CSR computer 108 may be limited to accessing certain sub-databases according to the analyst credentials of the analyst operating the CSR computer 108. Similarly, the CSR computer 108 may receive updates or notification messages that the CSR computer 108 presents on a GUI to the CSR. A system server 102, or other server of the system 100 may trigger and transmit the notification to each CSR computer 108 having CSR credentials with access attributes indicating the role of the CSR. For instance, CSR may have CSR credentials with attributes that indicate that the CSR specializes in handling particular subject matter requests. When a new session record is captured, the system server 102 or other device may transmit a notification message to the CSR of the CSR computer 108.

Analyst computer 106 may be computing devices that analysts may use to identify and mitigate fraud requests by customers. An analyst computer 106 may be any computing comprising a processor and capable of performing the various tasks and processes described herein. Non-limiting examples of an analyst computer 106 may include laptops, desktops, servers, tablets, and smartphones. An analyst computer 106 may be coupled via one or more internal or external networks 114. Software executed by the analyst computer 106 permits an analyst to select a session record from the database 104 and then review the session record to identify and mitigate fraud or security threats. An analyst operating the analyst computer 106 may also be receive requests from CSR operating the CSR computer 108 and transmit responses to the request to the CSR computer 108. The request may be to receive any information associated with a customer such as account data of a customer, all session records associated with a customer, and data of all CSRs previously interacted with a customer.

Customer devices 110 may be any computing and/or telecommunications device comprising a processor and capable of performing the various tasks and processes described herein, such as accessing a webserver 112 and providing a GUI interface to a customer to interact with a customer-centric website hosted on the webserver 112. Non-limiting examples of a customer device 110 may include a first customer device such as a telephone 110a (e.g., POTS landline telephone, cellular telephone, smartphone), a second customer device such as a client computer 110b (e.g., desktop, laptop, server, tablet), or any other telecommunications or computing device used to communicate with enterprise services.

In some embodiments, a customer device 110 may be any computing device allowing a customer to interact with a system server 102 and/or a CSR computer 108 via a webserver 112. The customer device 110 may execute an Internet browser or local application that access the webserver 112 in order to issue requests or instructions to the system server 102 and/or the CSR computer 108 to access the system 100. The customer device 110 may transmit credentials such as customer identification inputs to the webserver 112, from which the webserver 112 may authenticate the user and, in some implementations, determine a customer role. One having skill in the art would appreciate that the customer device 110 may comprise any number of input devices configured to receive any number of data inputs (e.g., mouse, keyboard, touchscreen, stylus), including various types of data inputs allowing for authentication, e.g., username, passwords, certificates, biometrics. The customer device 110 may be any computing device comprising a processor and non-transitory machine-readable storage medium allowing the customer device 110 to perform the various tasks and processes described herein.

As an example of the customer device 110 operation, the customer device 110 may execute an Internet browser that accesses a webserver 112 hosting a website that allows the customers to communicate with a system server 102 and/or a CSR computer 108. Using the customer device 110, a customer may then chat with a CSR operating the CSR computer 108 on the customer-centric website. As the communication proceeds, the customer device 110 may be used by the customer to upload machine-readable computer files (e.g., PDF, DOC, XSL) containing customer request information. The computer files may be stored into document records in the database 104. The customer device 110 may issue queries or instructions to the system server 102 and/or the CSR computer 108 via the webpages generated by the webserver 112, which then instruct the system server 102 and/or the CSR computer 108 to perform various tasks, such as retrieving or updating a file from the database 104.

Database 104 are capable of storing customer data, CSR data, and session records in plain format and/or encrypted version containing data fields that are associated with a communication channel between a customer and a CSR. The database 104 may be in communication with a processor of a system server 102 and/or a CSR computer 108, where the processor is capable of executing the various commands of the system 100. In some embodiments, the database 104 may be part of the system server 102. In some embodiments, the database 104 may be a separate component in communication with the system server 102.

A database 104 may also store data records associated with various aspects of the application services offered to end customers. Non-limiting examples of what may be stored in the database 104 may include user records that may comprise data fields describing users, e.g., customer data, such as customer credentials (e.g., username, passwords, biometrics, encryption certificates), customer account data, customer roles, or customer permissions; document records that may comprise machine-readable computer files (e.g., word processing files), parsed portions of such computer files, or metadata associated with computer files; and application data that may include software instructions executed by a system server 102 or data used by the such applications executed by the system server 102.

The database 104 may be hosted on any number of computing devices comprising a non-transitory machine-readable storage medium and capable of performing the various tasks described herein. As shown in FIG. 1, the system database 104 may be accessed by the system server 102 and other servers and devices of the system 100 via one or more networks 114. The database 102 may be hosted on the same physical computing device functioning as the system server 102 and/or functioning as other servers and devices of the system 100. In some embodiments, the database 104 may have a logical construct of data files that are stored in non-transitory machine-readable storage media, such as a hard disk or memory, controlled by software modules of a database program (for example, SQL), and a related database management system (DBMS) that executes the code modules (for example, SQL scripts) for various data queries and other management functions generated by the system server 102 and/or components of the system 100.

Figure 2:
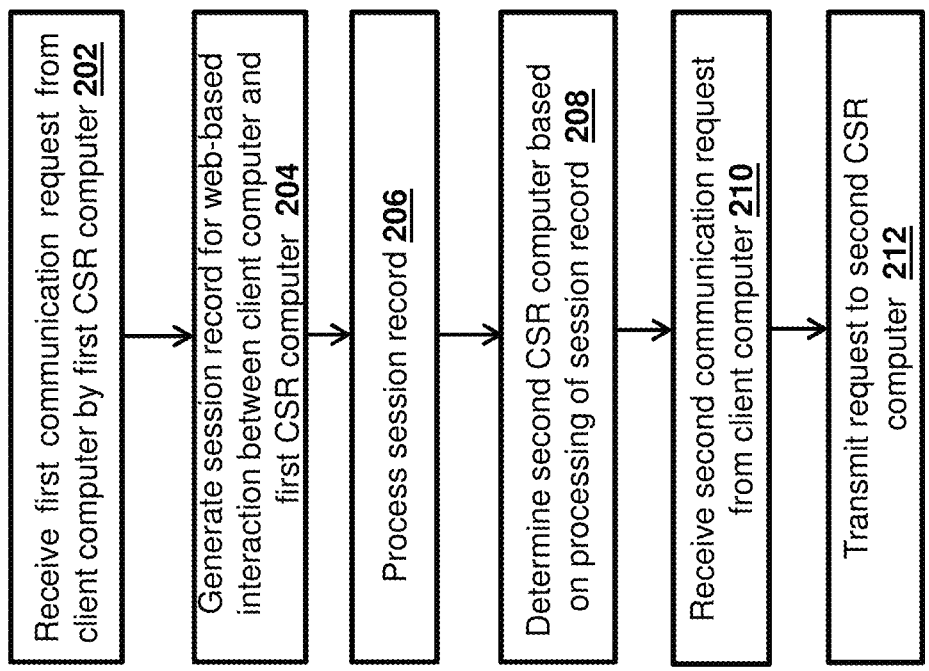
FIG. 2 shows execution of a method for seamless transfer of communication channels between a customer and customer service representatives (CSRs), according to an embodiment.

FIG. 2 shows execution steps of seamless transfer of communication channels between a customer and customer service representatives (CSRs), according to a method 200. The method 200 shown in FIG. 2 comprises execution steps 202, 204, 206, 208, 210, 212, and 214. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another. In addition, the method 200 of FIG. 2 is described as being executed by a single server computer, referred to as a system server in this embodiment. However, in some embodiments, steps may be executed by any number of computing devices operating in a distributed computing environment. In some cases, a computer executing one or more steps may be programmed to execute various other, unrelated features, where such computer does not need to be operating strictly as the system server described herein.

In a first step 202, a system server receives a first communication request from a first client computer (also called as a first customer device) operated by a user. The first client computer may transmit the first communication request to the system server via a webserver using one of a plurality of communication channels. The plurality of communication channels may include, but not limited to, a voice call, an instant message service (IM), a short message service (SMS) message service, an e-mail, and a voicemail.

Upon the receipt of the first communication request, the system server connects the first client computer to a first CSR computer operated by a first CSR over a wireless access network. A user operating the first client computer upon establishing a real-time communication session with the first CSR operating the first CSR computer over a wireless access network provides identification data such as a user name, a user ID, and an account number to the first CSR. In some embodiments, either the system server and/or the first CSR computer transmits a user authentication request to the first client computer. Upon receiving the authentication request, the first client computer then transmits the identification data such as a customer name, a customer ID, and an account number to the system server and/or the first CSR. The first CSR and/or the system server then verifies the identification data such as the customer ID and the account number of the user from data records of the user stored in a database.

In a next step 204, a system server generates and/or captures a session record for a web-based interaction comprising a real-time communication session between a first client computer and a first CSR computer. The session record may include a text stream. The text stream may be parsed to identify a plurality of texts representing a conversation between a customer operating the client computer and a first CSR operating the first CSR computer. The plurality of texts may include alphanumeric characters including alphabets, numbers, emoticons, symbols, etc. That is, the plurality of texts includes string of alphanumeric characters used by the user (operating the first client computer) to communicate with the CSR. The session record may also contain customer authentication status and data fields related to the interaction, such as a session identifier, a timestamp, a user identifier, a first CSR computer identifier uniquely identifying the first CSR computer, and a first client device identifier uniquely identifying the first client device. The device identifiers uniquely identifying the devices is selected from a group consisting at least one of a phone number, an IP address, and a device ID.

In some embodiments, a session record may include a voice conversation exchanged between a user operating a first client computer and a first CSR operating a first CSR computer. The server then converts the voice conversation into a text stream using a voice-to-text conversion technique. The text stream may then be parsed to identify a plurality of texts. The server may execute one or more algorithms to convert the voice data into the text data.

In a next step 206, a system server processes a session record corresponding to a web-based interaction comprising a real-time communication session between a first client computer and a first CSR computer. The system server may use information within the session record as inputs into a session analysis algorithm of a session analysis generator. The system server then executes the session analysis algorithm to generate computer comprehension data (also referred to herein as insights) from the session record.

In some embodiments, in order to generate the insights from content within the session record, the system server may determine occurrence of one or more texts from a plurality of texts matching a pre-defined list of attributes. The pre-defined list of attributes may include a list of one or more words corresponding to one or more model scenarios. The one or more model scenarios may be computer files stored on the system server or separate database device, such as a database, and comprise a set of pre-defined example requests that indicate a type of scenario of potential user request. The insights may correspond to a particular customer problem associated with one or more user products, a location of the user, and life events of the user. For example, the session record may include words such as "foreign," "transfer," and "travel," and upon execution of the session analysis algorithm, the system may determine that a user request is potentially associated with scenarios corresponding to foreign travel of a user and/or foreign transfer of funds.

In some embodiments, a system server may generates insights from a session record by inputting data of the session record into a session analysis generator. The system server may then execute a session analysis algorithm of the session analysis generator after providing the session record data as an input to the session analysis generator. The session record generator may then generate data structures from the session record data based on one or more computer comprehension data generation rules (also known as one or more insights generation rules). The one or more insights generation rules correspond to at least a semantic relationship between textual data of the session record. For instance, the one or more insights generation rules correspond to a semantic relationship between the alphanumeric characters within the set of alphanumeric characters. The session analysis generator applies the insights generation rules on the session record data, and determine the semantic relationships between the textual data of the session record. The semantic relationships correspond to the associations that there exist between the meanings of words in the textual data (semantic relationships at word level), between the meanings of phrases in the textual data, or between the meanings of sentences (semantic relationships at phrase or sentence level) in the textual data. Thus, based on analysis of semantic relationship between words of the textual data of the session record, the session analysis generator outputs data structures specifying different types of insights.

In a next step 208, a system server may determine a second CSR computer operated by a second CSR from a plurality of CSR computers based on insights obtained from processing of a session record. In some embodiments, a system server may determine a second CSR computer operated by a second CSR from a plurality of CSR computers based on information associated with all previous interactions between a user and all CSRs. In some embodiments, a system server may determine a second CSR computer operated by a second CSR from a plurality of CSR computers based on last CSR who interacted with a user on a communication channel, which may be different from a communication channel of interaction between a user and a first CSR computer. In some embodiments, each of the CSRs operating the plurality of CSR computers are assigned to work on user requests based on the expertise of the CSR. Based on insights and/or other information, the system server determines potential user request and/or problem associated with one or more user products, and accordingly the system server determines a second CSR computer configured to operate on matters same or similar to the potential user request and/or problem associated with one or more user products.

In a next step 210, a system server receives a second communication request from a second client computer. The second client computer may transmit the second communication request to the server via a webserver using a voice call communication channel. In alternate embodiments, the second client computer may transmit the second communication request to the server via a webserver using any other communication channel without limiting the scope of the disclosed embodiments. The communication channels may include an instant message (IM), a short message service (SMS) message, an e-mail, a voicemail, and a search query. In some configurations, the system server receives a notification from a second server where the second server is operationally connected to a call center. For instance, when the user calls a call center of an institution associated with the system server, the call center server (not shown in figures) may transmit a notification to the system server regarding the call.

In a next step 212, a system server verify identification data of a user operating a second client computer. In some embodiments, the system server may first determine user identification data based on device identification data of the second client computer from which a second communication request has been received. For instance, as described above, the system server may store different device identifiers (e.g., IP address, MAC address, and the like) of each user within a database. When the user calls the call center using the second client computer, a call center server (or a different module of the system server) may retrieve an identifier associated with the second client computer. The system server may then query the identifier and determine a user associated with the second client computer.

Upon verifying the identification data of the user (e.g., upon the identifier of the second client computer matching and identifier of the user), the system server then establishes a real-time communication session between the second client computer and a second CSR computer over a wireless access network by routing the voice call from the second client computer to the second CSR computer. When the second CSR computer receives the voice call, at the same time, the system server may also trigger display of a plurality of interactive hyperlinks on a display of the second CSR computer. The second CSR may then interact with an interactive hyperlink. Upon the second CSR interacting with any hyperlink, the server dynamically renders a browser on the second CSR computer that displays data corresponding to at least one of the text stream, the authentication status, and the identification data of the user. For example, the one or more hyperlinks may correspond to the session records from the system server where the session record is related to subject matter expertise (e.g., type of department) or procedural role expertise (e.g., time-sensitive) of the respective CSR operating the second CSR computer. The session record may include the insights, the text stream, the authentication status, and the identification data of the user to the second CSR computer. The session record may further include information associated with all previous requests of a user and information associated with all previous interactions between a user and CSRs. In some implementations, the session records received by the second CSR from the system server may have a data field identifying the nature of the user request and another data field indicating a time-sensitive nature or user-sensitive nature of the user request. In some embodiments, the second CSR computer may generate and transmit a request to the system server and/or analyst computer to receive additional information associated to the user. Upon receiving the additional information from system server and/or the analyst computer, a second CSR operating the second CSR computer then engages in communication with the user operating the second client computer.

Figure 3:
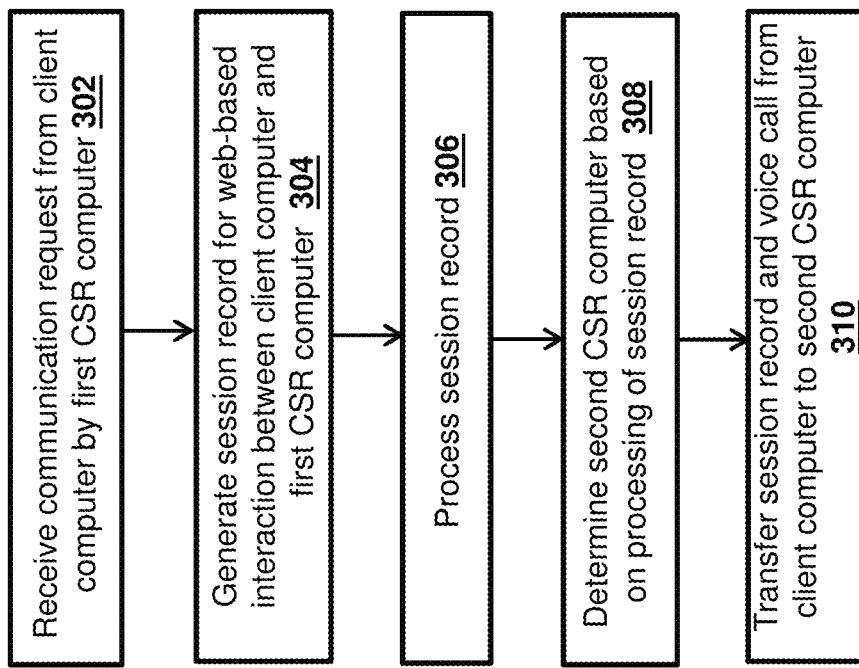
FIG. 3 shows execution of a method for seamless transfer of communication channels between a customer and customer service representatives (CSRs), according to an embodiment.

FIG. 3 shows execution steps of seamless transfer of communication channels between a customer and customer service representatives, according to a method 300. The method 300 shown in FIG. 3 comprises execution steps 302, 304, 306, 308, and 310. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another. In addition, the method 300 of FIG. 3 is described as being executed by a single server computer, referred to as a system server in this embodiment. However, in some embodiments, steps may be executed by any number of computing devices operating in a distributed computing environment. In some cases, a computer executing one or more steps may be programmed to execute various other, unrelated features, where such computer does not need to be operating strictly as the system server described herein.

In a first step 302, a system server may receive a communication request from a client computer (also called as a customer device). The client computer may transmit the communication request to the system server using one of a plurality of communication channels. The plurality of communication channels may include, but not limited to, a voice call, an instant message service (IM), a short message service (SMS) message service, an e-mail, and a voicemail.

Upon processing the communication request, the system server connects the client computer to a first CSR computer of a plurality of CSR computers over a wireless access network. A customer operating the client computer upon establishing a real-time communication session with the first CSR operating the first CSR computer over a wireless access network provides identification data such as a customer name, a customer ID, and an account number to a first CSR. In some embodiments, either the system server or the first CSR computer transmits an identification data request to the client computer. Upon receiving the identification data request, the client computer then transmits the identification data such as a customer name, a customer ID, and an account number to the system server and/or the first CSR. In some embodiments, the first CSR and/or the system server verifies the identification data such as the customer ID and the account number of the customer from data records of the customer stored in a database.

In a next step 304, a system server may generate and/or capture session records for a web-based interaction corresponding to a real-time communication session between a client device and a first CSR computer. In some embodiments, a session record may include a text stream. The text stream, as used herein, refers to a set of alphanumeric characters used by the user operating the client computer to communicate with the CSR. In some configurations, for example, when the session records are generated based on a chat session, the system server may retrieve all alphanumeric characters from the chat session. When the communication between the user and the CSR is telephonic, the system server may retrieve an audio file of the conversation and generate a machine-readable transcription of the communication.

The text stream may be parsed to identify a plurality of texts exchanged between a customer operating the client computer and a first CSR operating the first CSR computer. The session record may contain customer authentication status and data fields related to the interaction, such as a session identifier, a timestamp, a customer identifier, a first CSR computer identifier uniquely identifying the first CSR computer, and a client device identifier uniquely identifying the client device. The device identifiers uniquely identifying the devices is selected from a group consisting at least one of a phone number, an IP address, and a device ID.

In some embodiments, a session record may include a voice conversation exchanged between a customer operating the client computer and a first CSR operating the first CSR computer. The system server then converts the voice conversation into a text stream using a voice-to-text conversion technique. The text stream may then be parsed to identify a plurality of texts.

In a next step 306, a system server processes the session record. The system server delivers the session record to a session analysis algorithm. The system server generates insights from the session record upon the execution of the session analysis algorithm of a session analysis generator on the session record. To generate the insights, the system server may determine occurrence of one or more texts from the plurality of texts matching a pre-defined list of attributes. The pre-defined list of attributes may include a list of one or more words corresponding to one or more model scenarios. The one or more model scenarios may be computer files stored on the system server or separate database device, such as a database, and comprise a set of pre-defined example requests that indicate a type of scenario of potential customer request. The insights may include a customer problem with one or more customer products, location of the customer, and life events of the customer.

In some embodiments, the system server may generates insights from the session record by inputting data of the session record into a session analysis generator. The system server may then execute the session analysis algorithm of the session analysis generator after providing the session record data as an input to the session analysis generator. The session record generator then generates data structures from the session record data based on one or more insights generation rules. The one or more insights generation rules correspond to semantic relationship between textual data of the session record. The session analysis generator applies the insights generation rules on the session record data, and determine the semantic relationships between the textual data of the session record. Based on analysis of semantic relationship between the textual data of the session record, the session analysis generator outputs data structures specifying different types of insights.

In a next step 308, a system server may determine a second CSR computer operated by a second CSR from the plurality of CSR computers based on the insights obtained from the processing of the session record. For instance, each of the CSRs operating the plurality of CSR computers are assigned to work on customer requests based on the expertise of the CSR. Based on insights, the system server determines the customer request and/or problem associated with one or more customer products, and accordingly the system server determines a second CSR computer configured to operate on matters same or similar to the customer request and/or problem associated with one or more customer products.

In a next step 310, a system server may establish a real-time communication session between a client computer and a second CSR computer over a wireless access network, and then transfer the client computer from a first CSR to the second CSR computer over a same or different communication channel without losing authentication from the client computer.

In one example, a customer operating a client computer may be in a communication session over a voice call with a first CSR operating a first CSR computer, and then based on processing of voice call data in the communication session, a system server may transfer the customer operating the client computer to a second CSR operating a second CSR computer over same voice call without losing authentication. In another example, a customer operating a client computer may be in a communication session over a voice call with a first CSR operating a first CSR computer, and then based on processing of voice call data in the communication session, a system server may transfer the customer operating the client computer to a second CSR operating a second CSR computer over a text based chat channel without losing authentication. In another example, a customer operating a client computer may be in a communication session over a text based chat channel with a first CSR operating a first CSR computer, and then based on processing of text data in the communication session, a system server may transfer the customer operating the client computer to a second CSR operating a second CSR computer over same text based chat channel without losing authentication. In another example, a customer operating a client computer may be in a communication session over a text based chat channel with a first CSR operating a first CSR computer, and then based on processing of text data in the communication session, a system server may transfer the customer operating the client computer to a second CSR operating a second CSR computer over a voice based channel without losing authentication.

In some embodiments, when a system connects a customer operating a client computer with a second CSR operating a second CSR computer, the system server may also transmit one or more hyperlinks corresponding to the session record associated with the customer to the second CSR computer. The one or more hyperlinks may be displayed on a GUI of the second CSR computer. The second CSR may click on the one or more hyperlinks to obtain detailed information corresponding to the insights, the text stream, the authentication status, and the customer identification data of the customer. The second CSR operating the second CSR computer may use the session record data to identify the customer, and have a conversation with the customer without losing the context of the previous data disclosed by the customer to the first CSR computer.

Figure 4A:
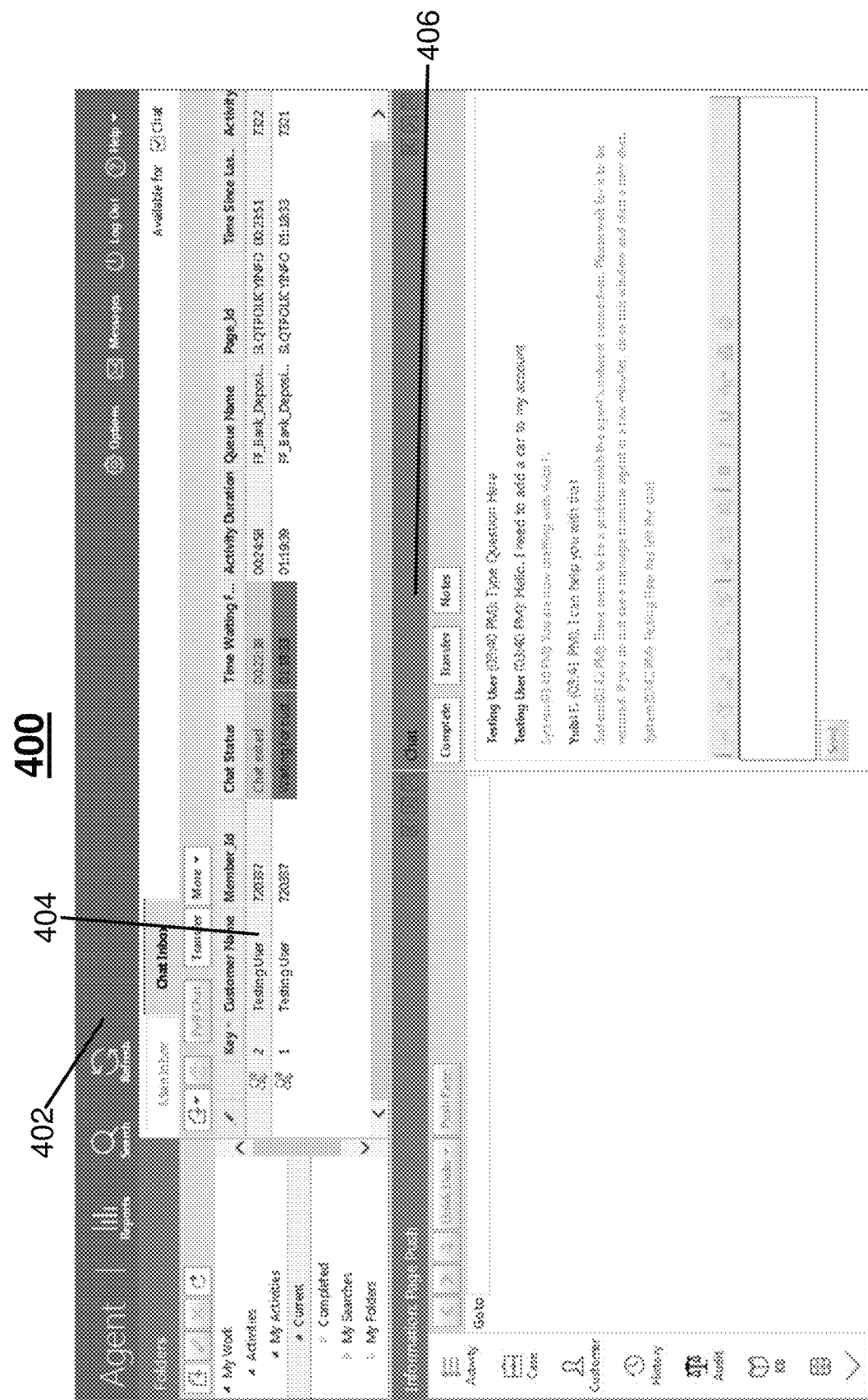
FIG. 4A illustrates a graphical user interface on a customer service representative computer operated by a CSR, according to an embodiment.

FIG. 4A illustrates a graphical user interface (GUI) 400 on a CSR computer operated by a CSR. The CSR computer may be any portable or non-portable device, such as a desktop computer, a laptop computer, a tablet computer, a smart phone, a smart watch, a gaming console, a personal digital assistant, or the like. The CSR computer may include a processor/microcontroller and/or any other electronic component that performs one or more operations according to one or more programming instructions. The CSR computer may be capable of communicating with a system server through a communications network using wired or wireless communication capabilities.

A customer management application may be installed on a CSR computer of a CSR. The CSR may be an agent, an analyst, and/or a service provider. In some embodiments, a company/entity may generate the customer management application as a widget to communicate with different customers, and the widget may be displayed on the display of the CSR computer.

A CSR computer may have access to one or more databases or pre-stored web-based interfaces, such as webpages, including a number of preconfigured sub-interfaces, or containers, that are dynamically populated. One or more outputs or results may display webpages that may contain additional code for containers, where the container code displays the customer management application widget. A user may access the CSR computer and interact with GUI 400 displaying the customer management application. In some implementations, the CSR computer may be configured to require authentication based upon a set of authorization credentials (e.g., password, biometrics, cryptographic certificate) to provide access to the customer management application on the CSR computer. For example, the CSR computer may access a database configured to store the CSR credentials, which a webserver may be configured to reference in order to determine whether a set of entered credentials purportedly authenticating the CSR match an appropriate set of credentials that identify and authenticate the CSR. Similarly, in some implementations, a webserver may generate and serve applications/webpages associated to the customer management application to the CSR computer based upon a CSR skills. In some embodiments, the webserver may generate and serve webpages associated to the customer management application such as a webpage 402 to the CSR computer based upon the CSR role. In such implementations, the CSR role may be defined by data fields in the CSR records stored in the database, and authentication of the CSR and the CSR role may be conducted by the webserver by executing an access directory protocol.

During operation, a customer (such as a testing user 404) operating a client computer may be in a text based communication session with a first CSR operating a first CSR computer. A record 406 corresponding to the text based communication session is displayed on a GUI 400 of the first CSR computer. As seen in the record 404, the text based chat got disconnected due to bad network connection. A system server may then process all content in the record 404 to generate insights. The insights may indicate that a testing user 404 wants to add a new product (car) into his/her account. Based on the insights, the system server may determine that a second CSR operating a second CSR computer is best suited to help the testing user 404 with adding car to their account. The system server may then transmit customer name, customer ID, record 404, and other information associated with the testing user 404 to the second CSR. When the network session is restored, and the system server is able to connect again to the testing user 404 operating the client computer, then then system server may connect the testing user 404 operating the client computer with the second CSR computer being operated by the second CSR without losing authentication and the context of the previous data disclosed by the customer to the first CSR computer. The system server may connect the testing user 404 operating the client computer with the second CSR computer being operated by the second CSR over same channel (text based) or a different channel (voice based).

In some embodiments, the network session may not be restored, and a system server may receive a new communication request from a testing user 404 operating a client computer. The new communication request may be through a text based channel or a voice call channel. In such a case, upon verifying the identity of the testing user 404 using identification data associated with the testing user 404 and/or the client computer, the system server may connect the testing user 404 to the second CSR computer operated by the second CSR. At the same time, the system server may transmit one or more hyperlinks to the CSR computer, which may be displayed on a GUI of the second CSR computer. The one or more hyperlinks may include authentication stays the testing user 404, the insights, the previous chat data, etc.

Figure 4B:
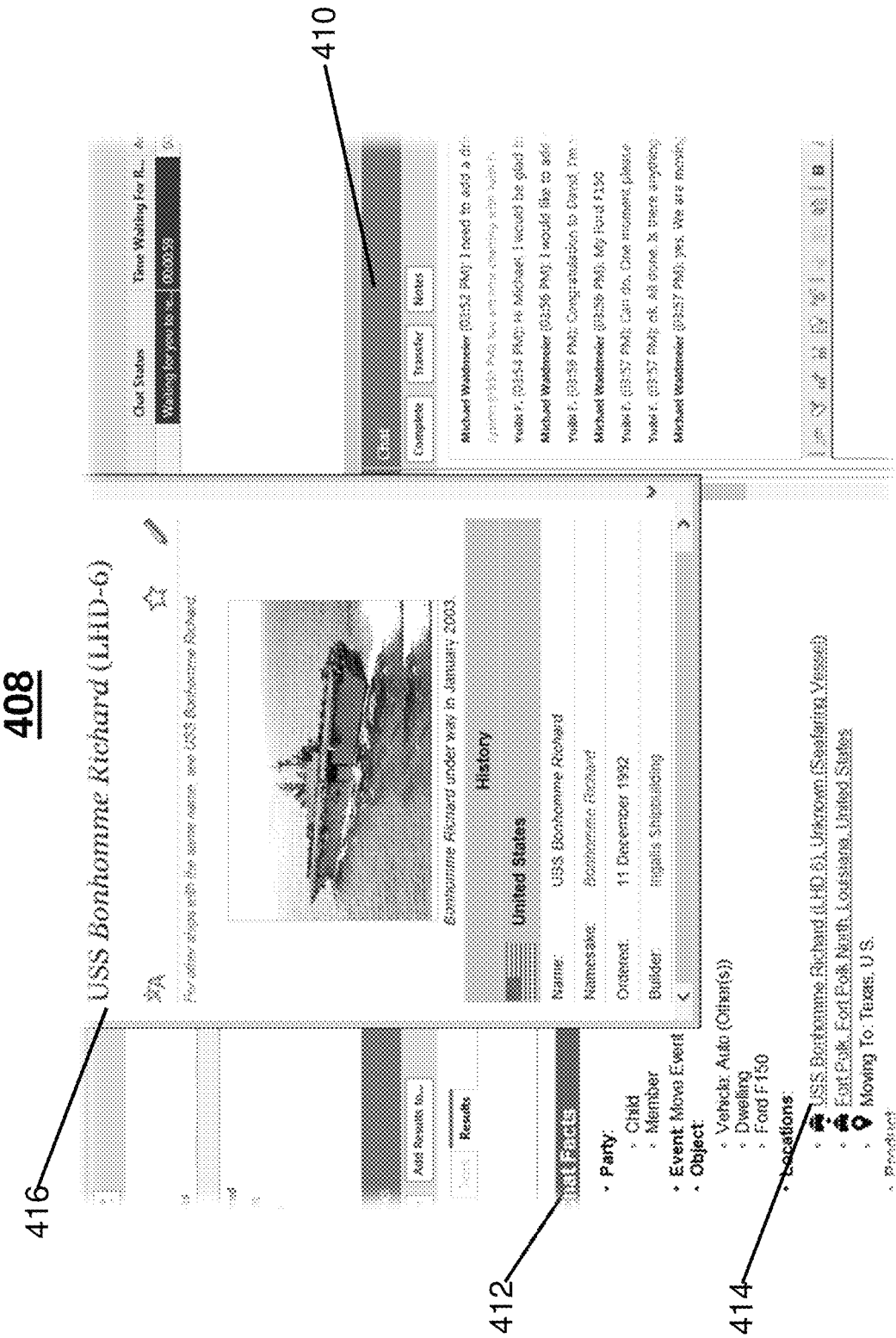
FIG. 4B illustrates a graphical user interface on a customer service representative computer operated by a CSR, according to an embodiment.

FIG. 4B illustrates a graphical user interface (GUI) 408 on a CSR computer operated by a CSR. A customer operating a client computer may be in a text based communication session with a first CSR operating a first CSR computer. A record 410 corresponding to the text based communication session/chat is displayed on a GUI 408 of the first CSR computer. At the same time, one or more chat facts 412 are displayed on a GUI 408 of the first CSR computer. The chat facts 412 may correspond to insights associated with the customer based on analysis of one or more earlier communication sessions between the customer and CSRs. In some embodiments, a server may execute real-time mining of information within the record 410 to generate and display the insights. For instance, based on the processing of the information within the record 410, the one or more chat facts 412 may display insights such as party, events, products, intents, objects (vehicle model, etc.), location (e.g., moving to Texas). Also, a web link 414 to reference pages for the one or more insights may be displayed. When a user selects the web link 414, a dialog box 416 may be displayed having a detailed information corresponding to the topics within the insights.

Figure 5:
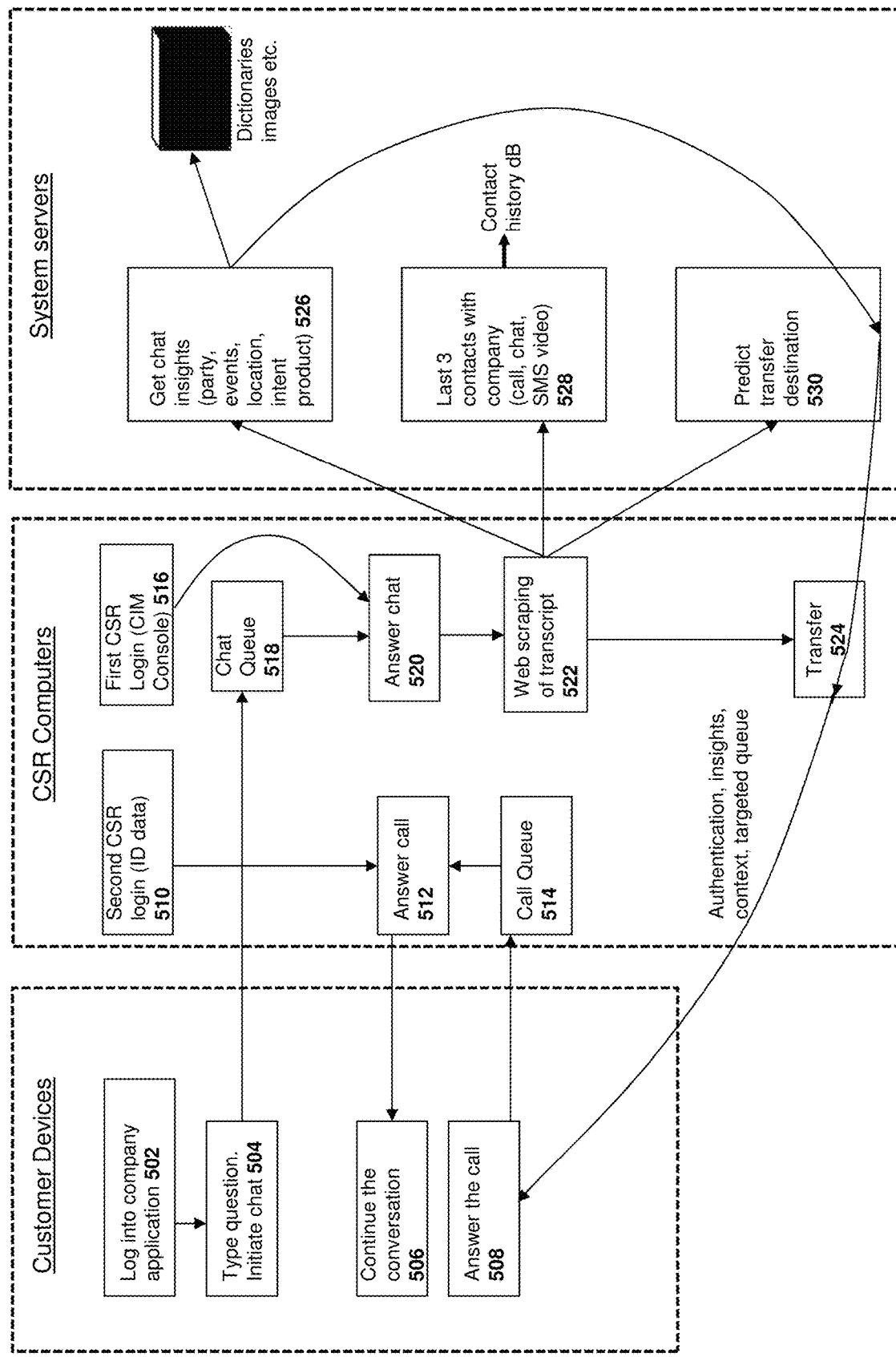
FIG. 5 illustrates steps corresponding to interaction between a customer device operating a customer and a customer service representative computer operated by a CSR via a system server, according to an embodiment.

FIG. 5 illustrates steps corresponding to interaction between a customer device operating a customer and a CSR computer operated by a CSR via a system server.

A customer device may be any portable or non-portable device, such as a desktop computer, a laptop computer, a tablet computer, a smart phone, a smart watch, a gaming console, a personal digital assistant, or the like. The customer device may include a processor/microcontroller and/or any other electronic component that performs one or more operations according to one or more programming instructions. The customer device may be capable of communicating with a system server and/or a CSR computer through a communications network using wired or wireless communication capabilities. The steps 502, 504, 506, and 508 are executed at the customer device.

A CSR computer may be any portable or non-portable device, such as a desktop computer, a laptop computer, a tablet computer, a smart phone, a smart watch, a gaming console, a personal digital assistant, or the like. The CSR computer may include a processor/microcontroller and/or any other electronic component that performs one or more operations according to one or more programming instructions. The CSR computer may be capable of communicating with a customer device and/or a CSR computer through a communications network using wired or wireless communication capabilities. The steps 510, 512, 514, 516, 518, 520, 522, and 524 are executed at the CSR computer.

A system server may be any portable or non-portable device, such as a desktop computer, a laptop computer, a tablet computer, a smart phone, a smart watch, a gaming console, a personal digital assistant, or the like. The system server may include a processor/microcontroller and/or any other electronic component that performs one or more operations according to one or more programming instructions. The system server may be capable of communicating with a customer device and/or a CSR computer through a communications network using wired or wireless communication capabilities. The steps 526, 528, and 530 are executed at the system server.

In operation, at step 502, a user may log into a company application on a customer device. The user may enter identification information such as username and password in order to log into the company application. Upon logging into the company application, the user may then generate a request for initiating a chat session and enter a question, at step 504. The user request may then be put into a queue of a CSR computer, at step 518. The chat queue may include a list of all requests received by all customers. At step 516, a first CSR may log into a customer management application on a first CSR computer. The first CSR may enter identification information such as customer name and password in order to log into the customer management application. At step 520, the first CSR may accept the request of the user, and then have a text-based communication session with the user. During the text-based communication session, the first CSR answers questions of the user in the text-based chat session. At step 522, the first CSR computer processes record of chat data transcript generated in the text-based chat session between the user and the first CSR. The first CSR computer may execute one or more scraping algorithms to process and scrape record of chat data transcript between the user and the first CSR. In some cases, the first CSR computer may transmit the record of chat data transcript between the user and the first CSR to a system server. At step 526, the system server may execute one or more algorithms to process record of chat data transcript between the user and the first CSR to generate insights. The one or more algorithms may be AI based algorithms to parse record of chat data transcript between the user and the first CSR to generate insights. At step 528, the system server may query a contact history database to determine a predetermined number of communication sessions, which have previously occurred between the user and any CSR of the company. In one example, the predetermined number of communication sessions between the user and any CSR may be at least last 3 sessions. At least one communication session of the 3 sessions between the user and any CSR should be a voice call session. At least one communication session of the 3 sessions between the user and any CSR should be a text-based chat session. At least one communication session of the 3 sessions between the user and any CSR should be a SMS video session. At step 530, based on analysis of the insights and/or records of earlier communication sessions between the user and any CSRs, a system server may then determine a second CSR who may be best suited to interact with the user and answer questions of the user. In other words, the system sever may transfer the customer device operated by the user to a second CSR computer operated by the second CSR. At step 524, a system server may execute a request to transfer a call to a customer device. In some cases, the system server may execute a request to initiate a new call to a customer device. At step 508, a customer device may answer the call transfer by the system server. In some cases, a customer device may answer the call initiated by the system server. Then, at step 514, the call may be put into a queue of a second CSR. In some cases, the call may an automated call and there may be no second CSR at other end of the call. In some cases, the call may an automated call and there may be a third CSR at other end of the call who may put the call into queue of the second CSR once the user answers the call. At step 510, a second CSR may log into a customer management application on a second CSR computer. The second CSR may enter identification information such as customer name and password in order to log into the customer management application. At step 512, the second CSR answer the call waiting in the queue, and have a voice-based communication session with the user. At step 506, the user operating the customer device continues the conversation with the second CSR operating the second CSR computer on a voice based call.

Figure 6:
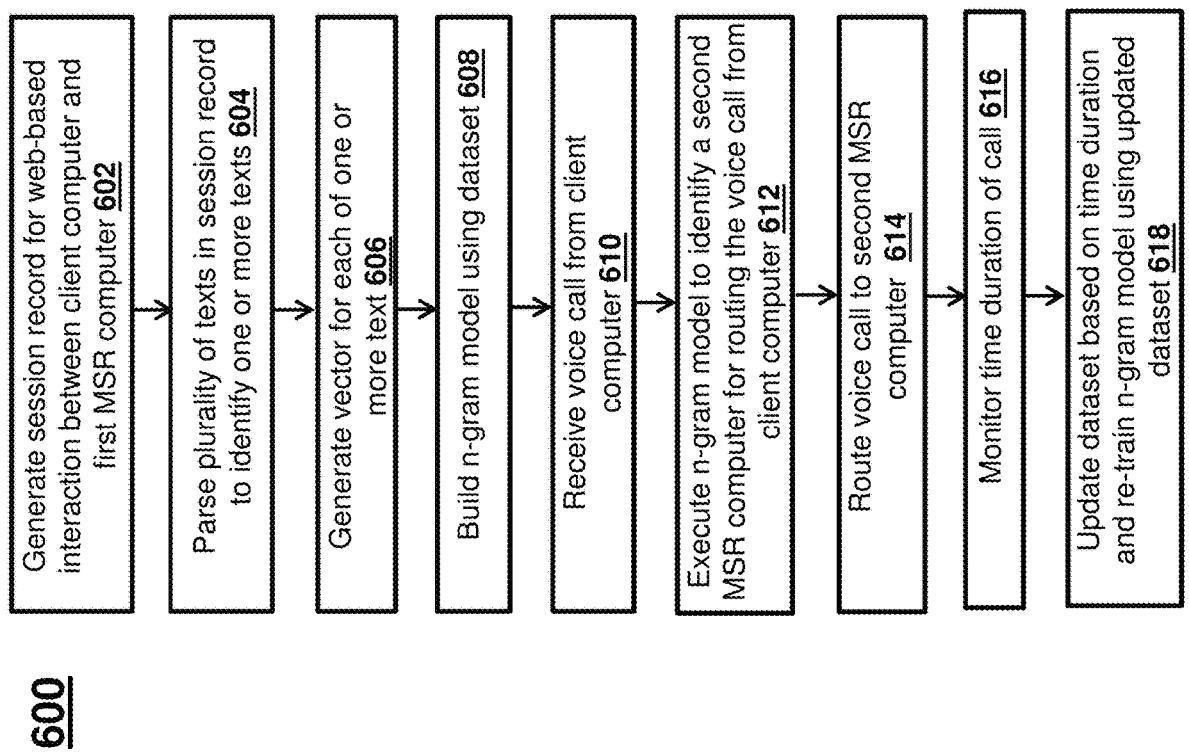
FIG. 6 shows execution of a method for seamless transfer of communication channels between a customer and CSRs, according to an embodiment.

FIG. 6 shows execution steps of seamless transfer of communication channels between a customer and customer service representatives, according to a method 600. The method 600 shown in FIG. 6 comprises execution steps 602, 604, 606, 608, 610, 612, 614, 616, and 618. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another. In addition, the method 600 of FIG. 6 is described as being executed by a single server computer, referred to as a system server in this embodiment. However, in some embodiments, steps may be executed by any number of computing devices operating in a distributed computing environment. In some cases, a computer executing one or more steps may be programmed to execute various other, unrelated features, where such computer does not need to be operating strictly as the system server described herein.

In a first step 602, a system server may receive a communication request from a client computer (also called as a customer device). The client computer may transmit the communication request to the system server via a webserver using one of a plurality of communication channels. The plurality of communication channels may include, but not limited to, a voice call, an instant message service (IM), a short message service (SMS) message service, an e-mail, and a voicemail. Upon the receipt of the communication request, the system server connects the client computer to a first CSR computer of a plurality of CSR computers over a wireless access network. A customer operating the client computer upon establishing a real-time communication session with the first CSR operating the first CSR computer over a wireless access network provides identification data such as a customer name, a customer ID, and an account number to the first CSR. In some embodiments, either the system server and/or the first CSR computer transmits a customer authentication request to the client computer. Upon receiving the authentication request, the client computer then transmits the identification data such as a customer name, a customer ID, and an account number to the system server and/or the first CSR. The first CSR and/or the system server then verifies the identification data such as the customer ID and the account number of the customer from data records of the customer stored in a database and authenticates the customer.

The system server then generate a session record for a web-based interaction comprising a real-time communication session between a client computer and a first CSR computer. The session record may include a text stream. The session record may also contain customer authentication status and data fields related to the interaction, such as a session identifier, a timestamp, a customer identifier, a first CSR computer identifier uniquely identifying the first CSR computer, and a client device identifier uniquely identifying the client device. The device identifiers uniquely identifying the devices is selected from a group consisting at least one of a phone number, an IP address, and a device ID.

In some embodiments, a session record may include a voice conversation exchanged between a customer operating a client computer and a first CSR operating a first CSR computer. The server then converts the voice conversation into a text stream using a voice-to-text conversion technique. The server may execute one or more algorithms to convert the voice data into the text data.

In a next step 604, a system server may parse the plurality of texts in the session record to identify occurrences of one or more texts from the plurality of texts matching a pre-defined list of attributes. The pre-defined list of attributes corresponds to a pre-defined list of words associated with one or more scenarios. The one or more scenarios may be computer files stored on the system server or separate database device, such as a database, and comprise a set of pre-defined example requests that indicate a type of scenario of potential customer request.

The system server may execute one or more parsing techniques to parse the plurality of texts in the session record to identify occurrences of one or more texts from the plurality of texts matching a pre-defined list of attributes. The system server may then determine a semantic relationship between the one or more texts. The semantic relationship between the one or more texts may correspond to one or more insights from the session record. The insights may correspond to a particular customer problem associated with one or more customer products, a location of the customer, and life events of the customer. For example, the one or more texts may include words such as "foreign," "transfer," and "travel," and insights corresponding to such text may be related to foreign travel of a customer and/or foreign money transfer.

In a next step 606, a system server may generate a vector for each of the one or more texts. The system server may execute one or more vector generating programs to generate a vector for each of the one or more texts. In some embodiments, the system server may execute one or more vector scoring protocols to generate a vector score for each of the one or more texts/words within the session record. The vector coring protocol may use a set of rules to score different texts/words where each text/word is compared to a pre-generated list of words and scored accordingly. The pre-generated list of words may be stored onto a local or an external database. For instance, the system server may query a database, retrieve a scoring table, and generate vector scores for each word (or only the parsed words as described above) within the session record. In some configuration, the score may correspond to an importance and/or relevance of the word. For instance, the word "technical" or "travel" is scored higher than "today."

In a next step 608, a system server may build an artificial intelligence n-gram model. The system server may build the artificial intelligence n-gram model using a dataset containing at least a map of vectorized texts containing a vector and/or a vector score for each of the pre-defined list of attributes interrelated to a vector and/or a vector score corresponding to a profile of a plurality of customer service representative computers operating the plurality of customer service representative computers.

In some embodiments, in the artificial intelligence n-gram model, each of the vectorized texts and/or the vectorized words in the dataset are formed into n-grams. An n-gram may be a sequence of n consecutive vectorized texts and/or the vectorized words. The n-gram may have an order, which is the number of vectorized texts and/or the vectorized words in the n-gram. For example, a 1-gram or unigram include one vectorized text and/or the vectorized word; a 2-gram or bi-gram includes two vectorized texts and/or the vectorized words. A given n-gram may be described according to different portions of the n-gram. An n-gram may be described as a context and a future vectorized text and/or the vectorized word, where the context has a length n-1 and w represents the future vectorized text and/or the vectorized word. For example, the 3-gram "the foreign transfer" may be described in terms of an n-gram context and a future vectorized text and/or the vectorized word. The n-gram context includes all vectorized texts and/or the words of the n-gram preceding the last vectorized text and/or the word of the n-gram. In the given example, "the foreign" is the context. The left most vectorized text and/or the word in the context is referred to as the left word. The future word is the last vectorized text and/or the word of the n-gram, which in the example is "transfer". The n-gram may also be described with respect to a right context and a backed off context. The right context includes all vectorized texts and/or the words of the n-gram following the first vectorized text and/or the word of the n-gram, represented as a (n-1)-gram. In the example above, "foreign transfer" is the right context. Additionally, the backed off context is the context of the n-gram less the left most vectorized text and/or the word in the context. In the example above, "foreign" is the backed off context.

In some embodiments, each vectorized text word in a pre-defined list of attributes may correspond to a single text word or a phrase defined with considerable latitude. For example, a phrase may be defined to be a consecutive list of text words, a list of text words that are contained in a single sentence, or a list of text words where each text word is from a different sentence but within a single paragraph. Each vectorized text word or a phrase may be mapped to a profile of at least one customer service representative from a plurality of customer service representatives operating a plurality of customer service representative computers. In one example, a vectorized text word "foreign" may be linked to a vector of a profile of a customer service representative specialized in foreign transaction matters. In another example, a vectorized phrase or a combination of vectorized text words "foreign transfer" may be linked to a vector of a profile of a customer service representative specialized in foreign transaction matters. In yet another example, a vectorized phrase "foreign transfer" may be linked to a vector of a profile of a customer service representative specialized all types of foreign matters.

The artificial intelligence n-gram model may be an artificial intelligence model containing a neural network corresponding to a set of interrelated neurons or nodes where a first subset of nodes may represent a vector value corresponding to vectorized list of attributes and a second subset of nodes may represent a vector value corresponding to a vectorized profile of CSRs. As will be further described below, the first subset and the second subset of nodes within the neural network may be interrelated based on a set of mathematical equations (e.g., correlation factor). Simply put, the artificial intelligence n-gram model is configured to receive as an input vectorized text from a session record (e.g., vectorized text from a web-based interaction (such as the chat session) between the user and the CSR) and map the vectorized text from the session record to a qualified CSR based on the CSR's profile.

A neural network may include an interconnected group of artificial neurons (or nodes) where each node may represent a vectorized text. For instance, one or more nodes within the neural network may represent a vectorized text from the predefined list of attributes and one or more nodes within the neural network may represent vectorized text within a CSR's profile. As described above, the system server may store a profile for each CSR comprising one or more attributes and skills regarding each particular CSR. The system server may generate the artificial intelligence n-gram model based on said neural network. The artificial intelligence n-gram model may represent a mathematical or computational model comprising mathematical functions describing the relationship between each neuron within the neural network using correlation factors including "weight" and "bias" factors. The artificial intelligence n-gram model may also comprise a mathematical function describing how the neurons are divided into one or more layers.

The system server may execute the artificial intelligence n-gram model to identify a suitable CSR for the user/customer based on the user's previous session records (e.g., chat session or voice call with a first CSR). The artificial intelligence n-gram model is particularly useful in routing a user to a suitable CSR where the complexity of the data makes manual routing impractical, inefficient, and nearly impossible to perform within the short allotted time (e.g., the time between receiving a call and routing the call to a CSR).

In a next step 610, a system server may receive a voice call from the client computer. The system server may then determine identification of the client computer using a phone number associated with the voice call. Upon identification of the client computer, the system server may query a database to determine one or more insights associated with a customer of the client computer. A database may store relationships between identification data of client computers, their customers, and one or more insights associated with the customer.

In a next step 612, a system server may execute the artificial intelligence n-gram model using an input of the one or more insights of the customer to identify a second customer service representative computer from the plurality of customer service representative computers associated with a vector representing profile of a second customer service representative operating a second customer service representative computer. The vector corresponding to the profile of the second customer service representative is correlated to the vector for at least one of the one or more texts. For example, the system server may execute the artificial intelligence n-gram model to identify the second customer service representative who may be specialized to work on matters related to the one or more insights associated with the customer.

In a next step 614, a system server may route the voice call received from the client computer to the second CSR computer. Along with routing of the call, the system server may also transmit one or more interactive hyperlinks corresponding to a session record to a second CSR computer. The second CSR computer GUI may receive the one or more hyperlinks corresponding to the session records from the system server where the session record is related to subject matter expertise (e.g., type of department) or procedural role expertise (e.g., time-sensitive) of the respective CSR operating the second CSR computer. The session record may include the insights, the text stream, the authentication status, and the identification data of the customer to the second CSR computer. The session record may further include information associated with all previous requests of a customer and information associated with all previous interactions between a customer and CSRs. In some implementations, the session records received by the second CSR from the system server may have a data field identifying the nature of the customer request and another data field indicating a time-sensitive nature or customer-sensitive nature of the customer request.

In a next step 616, a system server may monitor a time duration of call between the client computer and the second CSR computer. The system server may trigger a timer, which may start calculating a time duration of call between the client computer and the second CSR computer. The timer may begin once both the customer operating the client computer and the second CSR operating the second CSR computer start talking to each other.

In a next step 618, a system server may then compare the time duration of call between the client computer and the second CSR computer with a predetermined period of time. In one non-limiting example, the predetermined period of time may be 3 minutes. When the system server determines that the time duration of call between the client computer and the second CSR computer is less than 3 minutes, then the system server may conclude that the second CSR may not have been the best individual to speak with the customer. In such a case, the system server may then update the dataset, which is used to train the artificial intelligence n-gram model. For instance, the system server may change the correlation between the vector and/or the vector score for the at least one of the one or more texts with the vector and/or the vector score corresponding to the profile of the profile of the second customer service representative. Then, the system server may train the artificial intelligence n-gram model with updated dataset.

As the system server encounters false positives (e.g., a customer/user who is routed to a CSR but the call is terminated within the first three minutes) the system server may train the artificial intelligence n-gram model to refine itself in order to more accurately predict suitable CSRs. When a false positive is identified, the artificial intelligence n-gram model may reconfigure itself. In operation, the artificial intelligence n-gram model may use a back-propagation method to reconfigure the above-mentioned mathematical functions (e.g., weight and bias factors) and revise itself to account for the false positive. Therefore, the artificial intelligence n-gram model may never be complete and may be iteratively trained each time a false positive is identified. The system server may use a variety of methods to train the alert-generation model, such as evolutionary algorithm methods, simulated annealing methods, expectation-maximization methods, stochastic gradient decent method, and non-parametric methods.

EXAMPLE

In a non-limiting example, a user initiates an online chat session with a first CSR via a chat-enabled web application of an institution, executing on the user's computer, where the user discusses a problem regarding a mobile application with the first CSR. An hour after the user initiates the chat session with the first CSR, the user calls a call center of the institution, via his mobile phone. A system server of the institution, connected to a server of the call center, retrieves a unique identifier of the user's mobile phone and identifies that the call is associated with the user by matching the unique identifier with the user's profile. Because the call was originated within a predetermined time period (e.g., 1 hour) after the initial chat session, the system server retrieves a session record of the user's chat session. The session record includes the text (e.g., all alphanumeric values) of the user's conversation with the first CSR. The system server then identifies one or more of the determined words within the session record and generates a vector score for each word.

The system server then executes an artificial intelligence n-gram model by inputting the vectorized words from the session record. The artificial intelligence n-gram model includes a multilayered neural network where it compares the vectorized words to profiles of multiple CSRs and identifies a CSR that is best suited to satisfy the user's request. The system server then routes the received call (from the user) to the identified CSR (e.g., second CSR). The second CSR, for instance, may have skills relevant to the user's request from the first CSR (e.g., mobile application).

The system server then monitors duration of the user's call with the second CSR. When the duration of the call is shorter than a predetermined time (e.g., three minutes) the system server determines that the second CSR was incorrectly selected. Therefore, the system server trains the artificial intelligence n-gram model accordingly.

During the user's call (with the second CSR) the system server displays a graphical user interface (GUI) on the second CSR's computing device where the GUI is tailored towards the user's needs. For instance, the GUI may include one or more hyperlinks configured to show specific data gathered from analyzing the user's session record. For instance, when the second CSR hovers over, clicks, or otherwise interacts with a hyperlink, as described in FIG. 4, the system server displays data specific to the user's chat session with the first CSR (e.g., authentication data, location data, account data, profile data, and the like).

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the subject matter. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A server-implemented method comprising:
generating, by a server, a session record for a web-based interaction between a first client computer operated by a user and a first customer service representative computer, the session record comprising a set of alphanumeric characters representing a conversation between the first client computer and the first customer service representative computer, the session record further comprising authentication status and identification data of the user;
generating, by the server, computer comprehension data from the set of alphanumeric characters in the session record based at least on an occurrence of one or more alphanumeric characters from the set of alphanumeric characters matching a pre-defined list of attributes,
wherein the server generates data structures specifying different types of computer comprehension data based on one or more computer comprehension data generation rules, and
wherein at least one of the one or more computer comprehension data generation rules correspond to a semantic relationship between the alphanumeric characters within the set of alphanumeric characters;
determining at least one insight of a subject matter in the session record;
determining that the web-based interaction has reached a threshold of web-based interaction by the user;
in response to determining the at least one insight of the subject matter in the session record and the web-based interaction has reached the threshold;
selecting a second customer service representative to respond to the subject matter in the session record, and
originating a voice call between the second customer service representative and a second client computer associated with the user;
establishing a communication session between the second client computer associated with the user and a second customer service representative computer associated with the second customer service representative,
transmitting the voice call to the second customer service representative computer,
wherein transmitting the voice call transfers the user from the web-based interaction with the first customer representative computer to the voice call with the second customer service computer while maintaining the authentication status of the user, and
displaying, by the server, a graphical user interface on the second customer service representative computer, the graphical user interface comprising:
a plurality of interactive hyperlinks configured such that upon an activation of an interactive hyperlink, the server dynamically renders a browser that displays data corresponding to at least one of the computer comprehension data, the authentication status, and the identification data of the user.

2. The server-implemented method according to claim 1, wherein the user of the first client computer and the first customer service representative of the first customer service representative computer are capable of entering and exchanging information across a communication session for generating the session record.

3. The server-implemented method according to claim 1, further comprising:
establishing, by the server, a real-time communication session between the first client computer and the first customer service representative computer over a wireless access network.

4. The server-implemented method according to claim 3, further comprising:
authenticating, by the server, an identity of the user operating the first client computer upon establishing the real-time communication session between the first client computer and the first customer service representative computer based on verification of identification details provided by the user with data records of the user stored in a database.

5. The server-implemented method according to claim 1, further comprising:
establishing, by the server, a real-time communication session between the second client computer and the second customer service representative computer over a wireless access network upon routing of the voice call received from the second client computer to the second customer service representative computer, wherein the server routes the voice call received from the second client computer to the second customer service representative computer upon verifying association of device identifier uniquely identifying the second client computer with the user.

6. The server-implemented method according to claim 1, further comprising:
parsing, by the server, the set of alphanumeric characters in the session record to identify the one or more alphanumeric characters.

7. The server-implemented method according to claim 1, wherein the session record further comprises a session data, a session identifier, a timestamp, and a first customer service representative identifier.

8. The server-implemented method according to claim 1, further comprising:
receiving, by the server, a request initiated from the second customer service representative computer to share data corresponding to the user associated with the session record with the second customer service representative.

9. The server-implemented method according to claim 1, wherein the session record further comprises a device identifier uniquely identifying the first client computer, and wherein the device identifier is selected from a group consisting at least one of a phone number, an IP address, and a device ID.

10. The server-implemented method according to claim 1, wherein the computer comprehension data comprises user request, one or more user products, location of the user, and life events of the user.

11. A system comprising:
a plurality of customer service representative computers comprising a first customer service representative computer and a second customer service representative computer;
a first client computer and a second client computer where at least one of the first client computer and the second client computer is configured to originate a voice call; and
a server configured to:
generate a session record for a web-based interaction between the first client computer operated by a user and the first customer service representative computer, the session record comprising a set of alphanumeric characters representing a conversation between the first client computer and the first customer service representative computer, the session record further comprising authentication status and identification data of the user;
generate computer comprehension data from the set of alphanumeric characters in the session record based at least an occurrence of one or more alphanumeric characters from the set of alphanumeric characters matching a pre-defined list of attributes, wherein the server generates data structures specifying different types of computer comprehension data based on one or more computer comprehension data generation rules, and wherein at least one of the one or more computer comprehension data generation rules correspond to a semantic relationship between the alphanumeric characters within the set of alphanumeric characters;
determine at least one insight of a subject matter in the session record;
determine that the web-based interaction has reached a threshold of web-based interactions by the user;
in response to determining the at least one insight of the subject matter in the session record and the web-based interaction has reached the threshold;
select a second customer service representative to respond to the subject matter in the session record;
originate a voice call between the second customer service representative and a second client computer associated with the user;
establish a communication session between the second client computer associated with the user and a second customer service representative computer associated with the second customer service representative,
transmit the voice call to the second customer service representative computer,
wherein transmitting the voice call transfers the user from the web-based interaction with the first customer representative computer to the voice call with the second customer service computer while maintaining the authentication status of the user, and
display a graphical user interface on the second customer service representative computer, the graphical user interface comprising:
a plurality of interactive hyperlinks configured such that upon an activation of an interactive hyperlink, wherein the server dynamically renders a browser that displays data corresponding to at least one of the computer comprehension data, the authentication status, and the identification data of the user.

12. The system according to claim 11, wherein the user of the first client computer and the first customer service representative of the first customer service representative computer are capable of entering and exchanging information across a communication session for generating the session record.

13. The system according to claim 11, wherein the server is further configured to establish a real-time communication session between the first client computer and the first customer service representative computer over a wireless access network.

14. The system according to claim 13, wherein the server is further configured to authenticate an identity of the user operating the first client computer upon establishing the real-time communication session between the first client computer and the first customer service representative computer based on verification of identification details provided by the user with data records of the user stored in a database.

15. The system according to claim 11, wherein the server is further configured to establish a real-time communication session between the second client computer and the second customer service representative computer over a wireless access network upon routing of the voice call received from the second client computer to the second customer service representative computer, wherein the server routes the voice call received from the second client computer to the second customer service representative computer upon verifying association of device identifier uniquely identifying the second client computer with the user.

16. The system according to claim 11, wherein the server is further configured to parse the set of alphanumeric characters in the session record to identify the one or more alphanumeric characters.

17. The system according to claim 11, wherein the session record further comprises a session data, a session identifier, a timestamp, and a first customer service representative identifier.

18. The system according to claim 11, wherein the server is further configured to receive a request initiated from the second customer service representative computer to share data corresponding to the user associated with the session record with the second customer service representative.

19. The system according to claim 11, wherein the session record further comprises a device identifier uniquely identifying the first client computer, and wherein the device identifier is selected from a group consisting at least one of a phone number, an IP address, and a device ID.

20. A machine-readable storage medium having machine executable instructions stored thereon that, when executed by one or more processors, direct the one or more processors to perform a method comprising:
generating, by a server, a session record for a web-based interaction between a first client computer operated by a user and a first customer service representative computer, the session record comprising a set of alphanumeric characters representing a conversation between the first client computer and the first customer service representative computer, the session record further comprising authentication status and identification data of the user;
generating, by the server, computer comprehension data from the set of alphanumeric characters in the session record based at least on an occurrence of one or more alphanumeric characters from the set of alphanumeric characters matching a pre-defined list of attributes,
wherein the server generates data structures specifying different types of computer comprehension data based on one or more computer comprehension data generation rules, and
wherein at least one of the one or more computer comprehension data generation rules correspond to a semantic relationship between the alphanumeric characters within the set of alphanumeric characters;
determining at least one insight of a subject matter in the session record;
determining that the web-based interaction has reached a threshold of web-based interaction by the user;
in response to determining the at least one insight of the subject matter in the session record and the web-based interaction has reached the threshold;
selecting a second customer service representative to respond to the subject matter in the session record, and
originating a voice call between the second customer service representative and a second client computer associated with the user;
establishing a communication session between the second client computer associated with the user and a second customer service representative computer associated with the second customer service representative,
transmitting the voice call to the second customer service representative computer,
wherein transmitting the voice call transfers the user from the web-based interaction with the first customer representative computer to the voice call with the second customer service computer while maintaining the authentication status of the user, and
displaying, by the server, a graphical user interface on the second customer service representative computer, the graphical user interface comprising:
a plurality of interactive hyperlinks configured such that upon an activation of an interactive hyperlink, the server dynamically renders a browser that displays data corresponding to at least one of the computer comprehension data, the authentication status, and the identification data of the user.

* * * * *